(12) United States Patent  (10) Patent No.: US 8,525,372 B2
Huang  (45) Date of Patent: Sep. 3, 2013

(54) FEATHER-TOUCH DIMMING SWITCH

(76) Inventor: Huadao Huang, Yueqing (CN)

( * ) Notice: Subject to any disclaimer, the term of this patent is extended or adjusted under 35 U.S.C. 154(b) by 629 days.

(21) Appl. No.: 12/789,549

(22) Filed: May 28, 2010

(65) Prior Publication Data

US 2010/0301682 A1  Dec. 2, 2010

(30) Foreign Application Priority Data

May 31, 2009 (CN) ...................... 2009 2 0108314 U

(51) Int. Cl.
*H05B 37/02* (2006.01)
*H01H 3/00* (2006.01)

(52) U.S. Cl.
USPC ........... 307/139; 307/112; 307/113; 307/115; 307/157; 200/43.21; 200/61.19; 200/329; 200/339; 200/341; 315/136; 315/291

(58) Field of Classification Search
USPC ......... 307/112, 113, 115, 139, 157; 315/136, 315/291; 200/43.21, 61.19, 237, 329, 339, 200/341, 542
See application file for complete search history.

(56) References Cited

U.S. PATENT DOCUMENTS

| | | | |
|---|---|---|---|
| 3,763,396 A | 10/1973 | Shilling | |
| 4,563,592 A * | 1/1986 | Yuhasz et al. | 307/115 |
| 4,783,581 A * | 11/1988 | Flowers et al. | 200/542 |
| 4,835,343 A | 5/1989 | Graef et al. | |
| 5,207,317 A | 5/1993 | Bryde et al. | |
| D364,141 S | 11/1995 | Hanna et al. | |
| 5,608,196 A * | 3/1997 | Hall et al. | 200/61.19 |
| 5,637,930 A * | 6/1997 | Rowen et al. | 307/112 |
| 6,005,308 A | 12/1999 | Bryde et al. | |
| 6,727,446 B1 | 4/2004 | Mayo et al. | |
| 7,334,745 B2 * | 2/2008 | Crawford | 239/399 |
| 7,335,845 B2 * | 2/2008 | Johnsen et al. | 200/332 |
| 7,365,282 B2 | 4/2008 | Altonen et al. | |

* cited by examiner

*Primary Examiner* — Douglas W Owens
*Assistant Examiner* — Thai Pham
(74) *Attorney, Agent, or Firm* — Mei & Mark LLP

(57) ABSTRACT

A dimming switch comprises an enclosure with a mounting surface, a flat plate button mounted on the mounting surface, a dimming button, a tripping button, a dimmer mounted inside the enclosure, a resetting/tripping device, a dimming control circuit, a power input end configured to connect to a live wire of a power supply, and a power output end configured to connect to an electrical load. Pressing the flat plate button resets the resetting/tripping device, thereby electrically connecting the power input end with the power output end through the dimming control circuit. The dimming button is configured so that rotating the dimming button and pressing the dimming button up and down regulates the output voltage of the dimming control circuit. The tripping button and resetting/tripping device trip so that the electrical connection between the power input end and the power output end will be cut off.

20 Claims, 9 Drawing Sheets

FEATHER-TOUCH DIMMING SWITCH

This application claims the benefit of priority of Chinese patent application 200920108314.8, filed May 31, 2009, the content of which is incorporated herein by reference in its entirety.

TECHNICAL FIELD

The present disclosure relates generally to a touch-activated dimming switch for regulating the output power of a lamp.

BACKGROUND

To improve residence and office environments, more and more lamps are installed in rooms to give people bright indoor lighting. However, when the outdoor lighting is sufficient, or when there are fewer people in the room, or when people need to rest, people wish to have a dimmer light to save power.

But, currently, most of the switches used for controlling lamps do not have the function of regulating the light depending on demand. Although some switches have a dimming function, the operation is very complicated.

SUMMARY

Considering the above reasons, a feather-touch dimming switch can change the output power of a lamp through a simple operation to realize the purpose of power saving.

In one embodiment, a dimming switch comprises a dimming button, a tripping button, a resetting/tripping device, a dimming control circuit, and an enclosure comprising a mounting surface. A dimmer is mounted inside the enclosure. A flat plate button is mounted on the mounting surface. A power input end is configured to connect to a live wire of a power supply and a power output end is configured to connect to an electrical load.

The flat plate button is configured so that pressing the flat plate button resets the resetting/tripping device, thereby electrically connecting the power input end with the power output end through the dimming control circuit. The dimming button is configured so that rotating the dimming button and pressing the dimming button up and down regulates the output voltage of the dimming control circuit through the dimmer. The tripping button and resetting/tripping device are configured to trip so that the electrical connection between the power input end and the power output end will be cut off through the dimming control circuit.

In another embodiment, a feather-touch dimming switch may also have a dimming status memory function.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
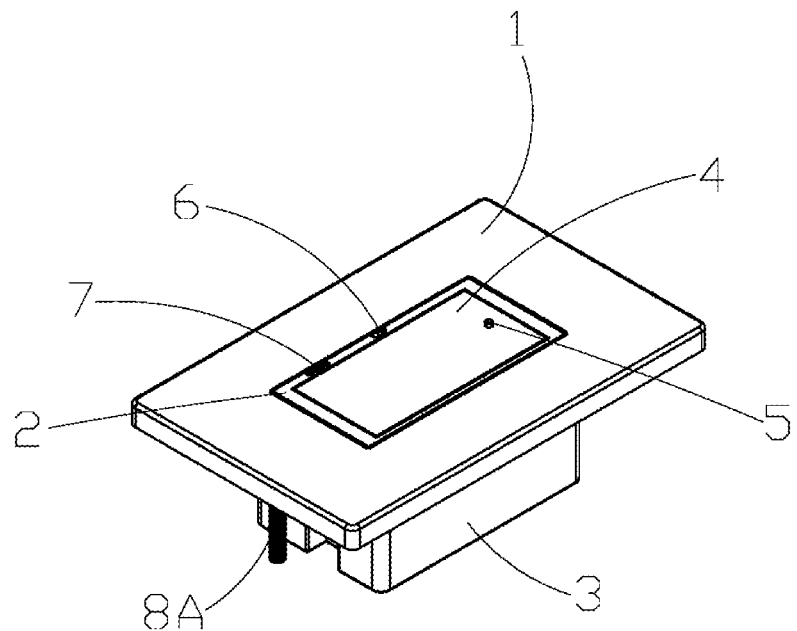
FIG. 1 is an example of a feather-touch dimming switch.
Figure 2:
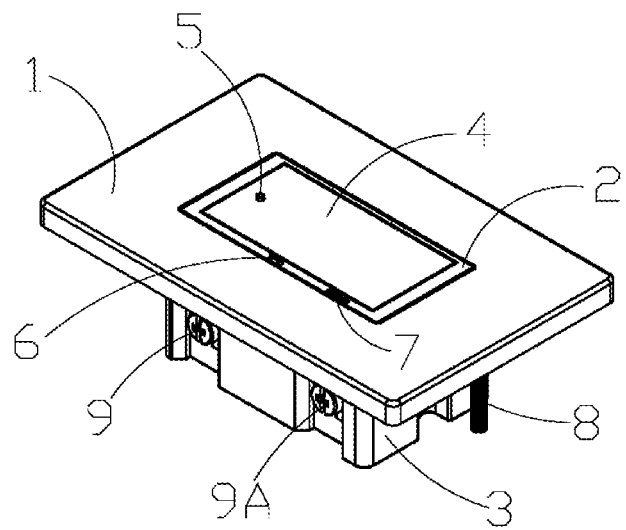
FIG. 2 is an example of an alternate view of a feather-touch dimming switch.
Figure 3:
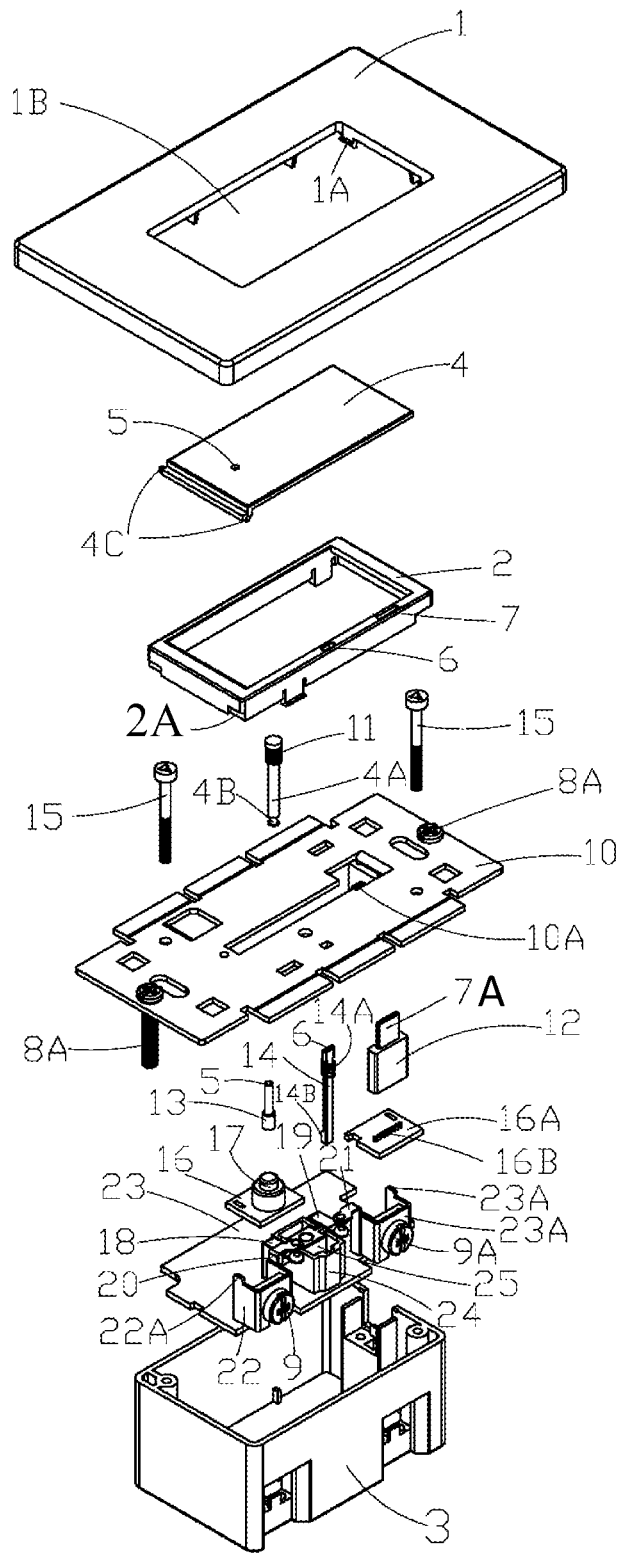
FIG. 3 is an exemplary structure diagram of a feather-touch dimming switch.
Figure 4:
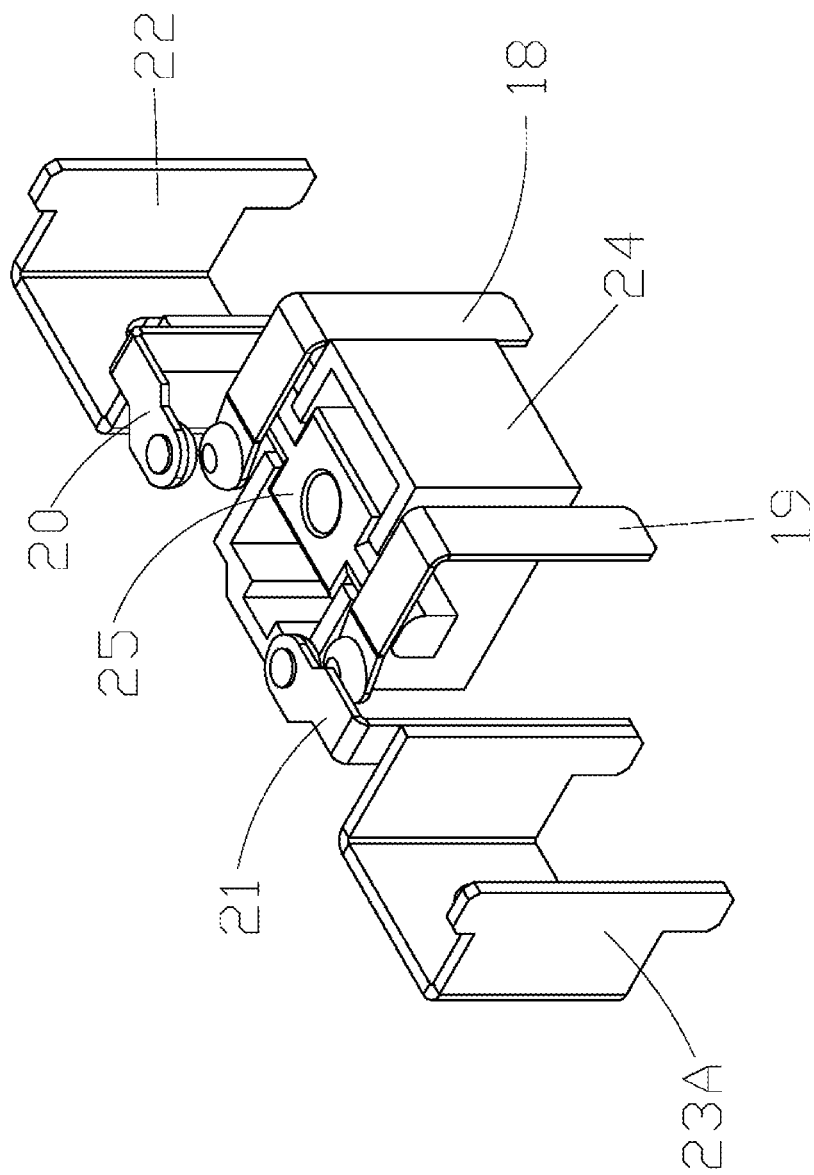
FIG. 4 is an exemplary structure diagram of a resetting/tripping, device.

As shown in FIGS. 1, 2 and 3, a feather-touch dimming switch may comprise an enclosure, a flat plate button 4 mounted on an enclosure surface, dimming button 5, tripping button 6, dimmer 17 mounted inside an enclosure, resetting/tripping device 24, dimming control circuit 23, power input end 9A connected with living wire of in-wall power supply, and power output end 9 connected with a load.

Pressing flat plate button 4 resets resetting/tripping device 24. Power input end 9A of the dimming switch connects electrically with power output end 9 through dimming control circuit 23. The dimming switch has power output.

Rotating the dimming button 5 regulates the output voltage of dimming control circuit 23, thereby changing the output power of the lamp. The flat plate button 4 comprises a dimming button hole at an end of the flat plate button, and the dimming button 5 is located in the dimming button hole such that the dimming button 5 is elevated higher than the flat plate button 4. By pressing tripping button 6, the power output of the dimming switch can be cut off. The tripping button 6 may act on a lock 26 comprising an inner wall and a top surface and a lock hole provided in the top surface. A tripper may comprise a longitudinal central hole in the middle and an outer wall. A resetting guide column 4A is configured to move up and down along the central hole. A portion of the resetting guide column protrudes downwardly through the central hole. The lock is movable and may comprise a metal material. A lock spring 27 may be located between the outer wall of the tripper and the inner wall of the lock. The switch may be configured so that when the flat plate button 4 is not pressed, the tip-shaped bottom surface is located above the lock 26 and is semi-offset with the lock hole. The switch may be configured so that when the flat plate button 4 is not pressed, the portion of the resetting guide column that protrudes downwardly through the central hole is semi-offset with the lock hole. The switch may be configured so that when the flat plate button 4 is pressed, the tip-shaped bottom surface of the resetting guide column penetrates the lock hole, the lock is pushed, and the lock spring is compressed. The switch may be configured so that when the flat plate button 4 is released from a pressed state, the resetting guide column moves up, the lock groove 4B is clutched in the lock hole, the tripper 25 moves up via a driving force from the lock 26, and the resetting/tripping device is reset. The switch may also comprise a tripping bar 14 below the tripping button 6, the tripping bar having a bottom surface. A tripping spring 14A may cover a portion of the tripping bar 14. A convex block 14B may be located at the bottom surface of the tripping bar 14. The resetting/tripping device may further comprise an inner wall. The lock may further comprise an outer wall. The tripper may further comprise an inner wall. The convex block may be located above the inner wall of the resetting/tripping device and the outer wall of the lock 26. The tripping button 6 may be configured so that when the tripping button is pressed, the tripping bar 14 moves downward, the convex block 14B inserts between the inner wall of the tripper 25 and the outer wall of the lock 26, the lock moves in an unlocking direction, the lock groove 4B disengages from the lock hole, and the resetting/tripping device trips.

As shown in FIG. 3, the enclosure is composed of panel 1, flat plate button frame 2, and base 3. A hole 1B is made in the middle of panel 1. Around hole 1B, a number of grabs 1A are provided. Flat plate button frame 2 is secured through groove 2A to grab 1A of panel 1.

Flat plate button 4 is pin-jointed through convex shaft 4C at one of its ends to flat plate button frame 2. By pressing the opposite end of flat plate button 4, flat plate button 4 can rotate around convex shaft 4C up and down.

Dimming button 5 and tripping button 6 are mounted on flat plate button frame 2.

As shown in FIGS. 3, 4, 5A and 5B, a resetting/tripping device 24 is provided below flat plate button 4. Resetting/tripping device 24 includes resetting guide column 4A below flat plate button 4, resetting spring 11 covering a portion of resetting guide column 4A, "T"-shaped tripper 25, lock 26 and lock spring 27.

"T"-shaped tripper 25 is located below, and is interlocked with, flat plate button 4. "T"-shaped tripper 25 extends outwards at its left and right sides to form lifting arms. Elastic metal sheets 18 and &19 are located above the lifting arms in the left and right sides of "T"-shaped tripper 25 respectively, and can move up and down along with tripper 25.

One end of each elastic metal sheet 19 and 18 is welded to dimming control circuit 23, and the other end is suspended below power input metal sheet 21 or power output metal sheet 20. At the ends of elastic metal sheets 19 and 18, moving contacts 19A and 18A are provided, respectively.

One end of power input metal sheet 21 is welded to dimming control circuit 23, and is connected with power input end 9A through terminal lug 23A. The other end is suspended above elastic metal sheet 19. A breakback contact 21A is provided at its end. One end of power output metal sheet 20 is welded to dimming control circuit 23, and is connected with power output end 9 through terminal lug 22. The other end is suspended above elastic metal sheet 18. A breakback contact 20A is provided at its end.

When the resetting/tripping device is in a tripped status (as shown in FIGS. 5, 6, and 8), power input metal sheet 21 or power output metal sheet 20 does not contact elastic metal sheet 19 or 18, and the dimming switch has no power output.

When the resetting/tripping device is reset (as shown in FIG. 7), elastic metal sheets 19 and 18 move while tripper 25 moves up. Breakback contacts 21A and 20A of power input metal sheet 21 and power output metal sheet 20 contact moving contacts 19A and 18A of elastic metal sheets 19 and 18. The dimming switch then has power output.

Figure 5A:
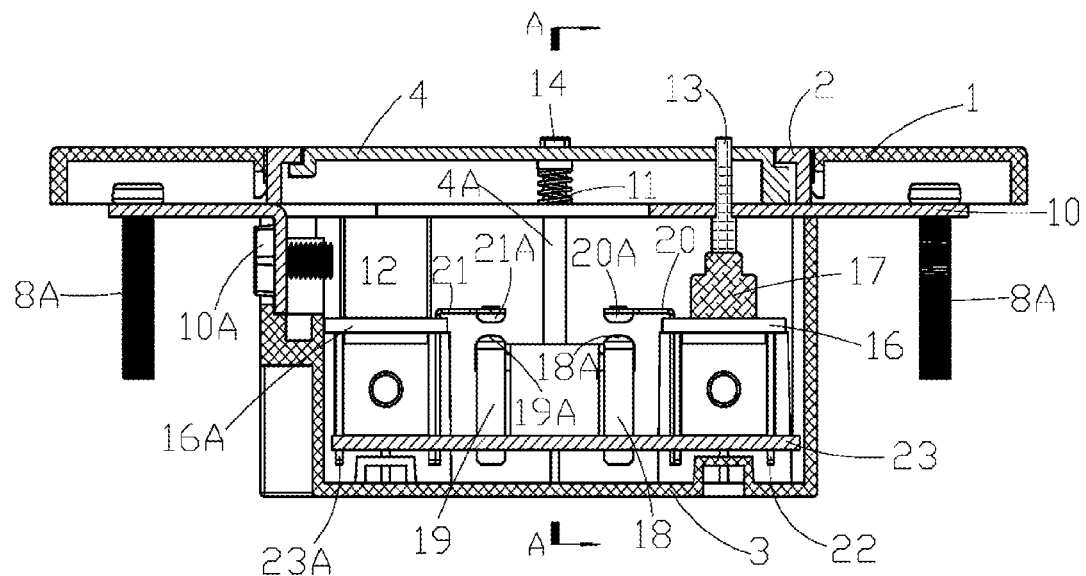
FIG. 5A is an exemplary side view of a feather-touch dimming switch when a flat plate button is not pressed down and a dimming switch is in an open status.
Figure 5B:
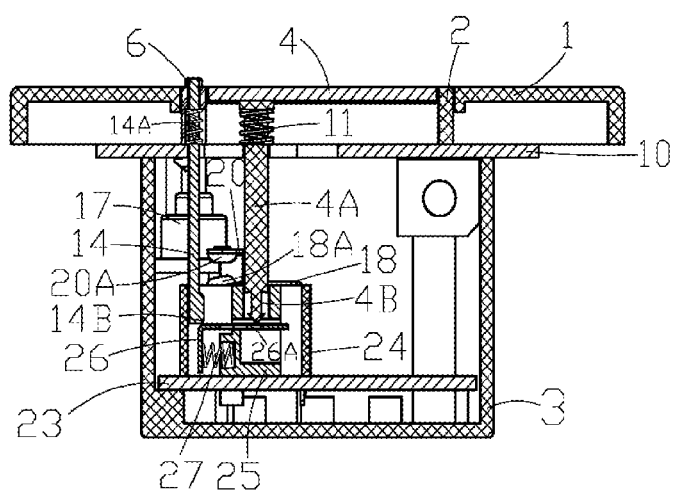
FIG. 5B is an exemplary side view of the switch of FIG. 5A along A-A.

As shown in FIGS. 3, 4, 5A and 5B, a longitudinal central hole is made in the middle of tripper 25. A resetting guide column 4A, which is located below flat plate button 4 and is covered with resetting spring 11, can move up and down along the central hole in the middle of tripper 25. As shown in FIGS. 5A and 5B, resetting spring 11 covering resetting guide column 4A is located between flat plate button 4 and metal grounding radiating plate 10. A depressed lock groove 4B is made on resetting guide column 4A close to its bottom. The bottom of resetting guide column 4A is tip-shaped. When flat plate button 4 is not pressed, the tip-shaped bottom of resetting guide column 4A is located above lock 26, and is semi-offset with lock hole 26A on lock 26, as shown in FIG. 5B.

A penetrating through-hole is made in the middle of tripper 25. A movable lock 26 made of metal material is provided at the through-hole in the middle of tripper 25. A lock hole 26A is provided at the top of lock 26. A lock spring 27 is provided between the outer wall of tripper 25 and the inner wall of lock 26.

As shown in FIGS. 5A and 5B, when flat plate button 4 is not pressed, the tip-shaped bottom of resetting guide column 4A that penetrates the central hole of tripper 25 is semi-offset with lock hole 26A on top of lock 26.

Figure 6A:
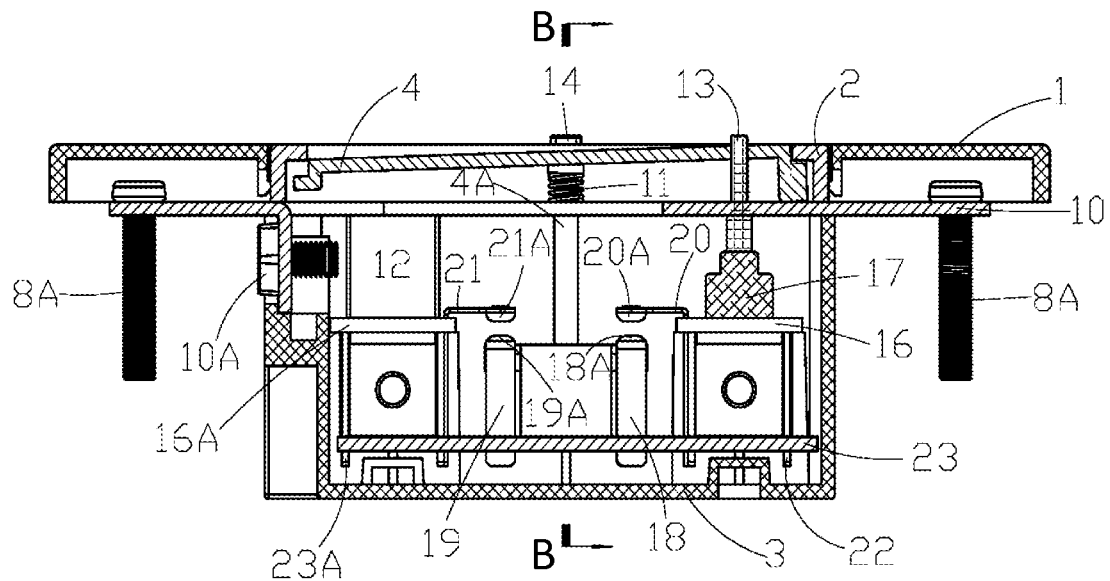
FIG. 6A is an exemplary side view of a feather-touch dimming switch when a flat plate button of a dimming switch is pressed down and the dimming switch is in an open state.
Figure 6B:
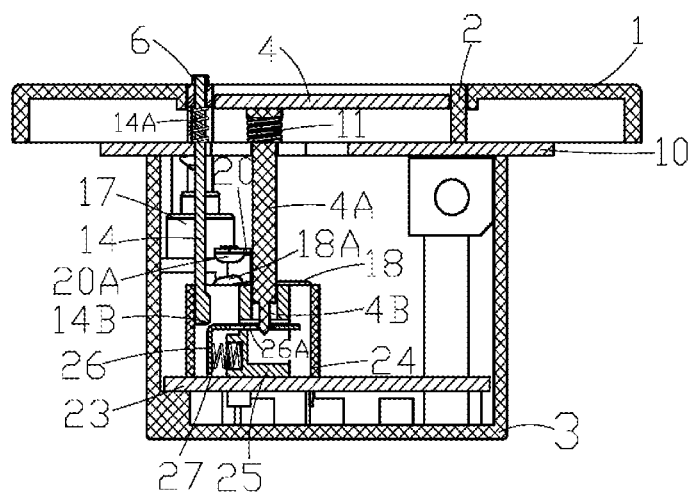
FIG. 6B is an exemplary side view of the switch of FIG. 6A along B-B.

As shown in FIGS. 6A and 6B, pressing flat plate button 4 makes the tip-shaped bottom of resetting guide column 4A penetrate lock hole 26A on top of lock 26. Lock 26 is pushed and lock spring 27 is compressed.

Figure 7A:
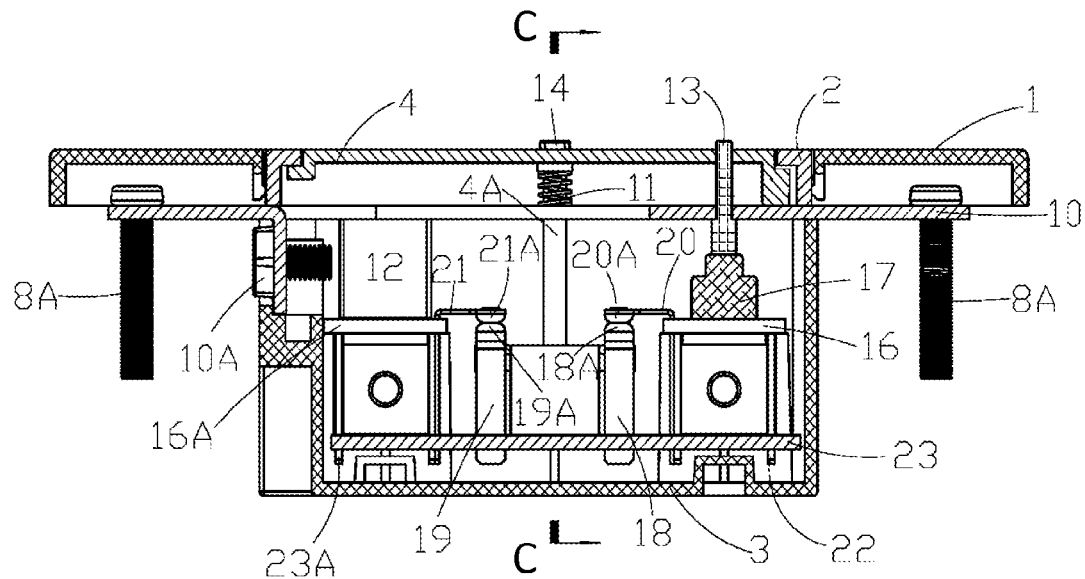
FIG. 7A is an exemplary side view of a feather-touch dimming switch when a flat plate button of a dimming switch is released, the resetting/tripping device is reset, and the dimming switch is closed with power output.
Figure 7B:
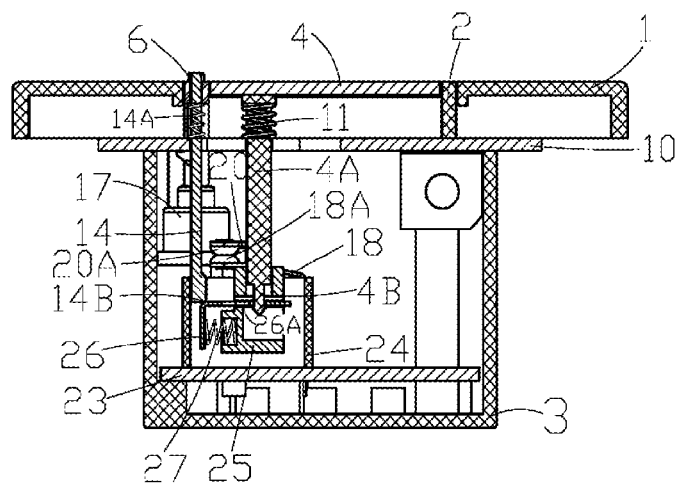
FIG. 7B is an exemplary side view of the switch of FIG. 7A along C-C.

As shown in FIGS. 7A and 7B, releasing flat plate button 4 causes resetting guide column 4A to move up under the action of spring 11. Lock groove 4B close to the bottom of resetting guide column 4A is clutched in lock hole 26A of lock 26, and tripper 25 moves up as driven by lock 26. Consequently, moving contacts 19A and 18A on metal sheets 19 and 18 on the lifting arms in the two sides of tripper 25 contact with breakback contacts 21A and 20A on power input metal sheet 21 and power output metal sheet 20. The dimming switch has power output.

Figure 8A:
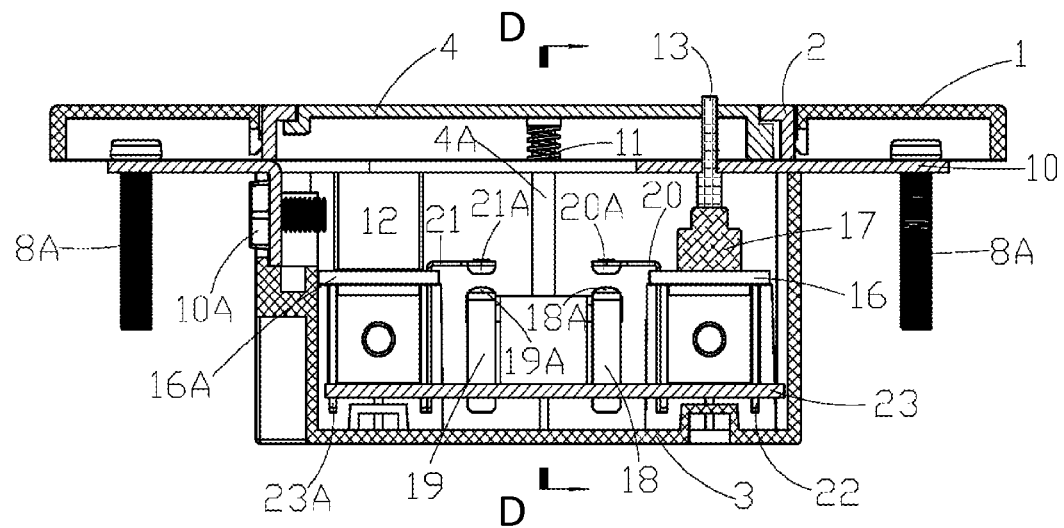
FIG. 8A is an exemplary side view of a feather-touch dimming switch when the resetting and/or tripping device of the dimming switch is reset and the dimming switch is open with no power output.
Figure 8B:
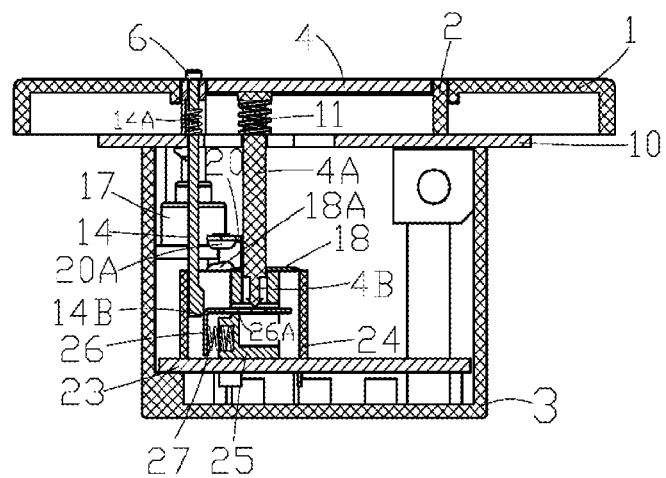
FIG. 8B is an exemplary side view of the switch of FIG. 8A along D-D.

As shown in FIGS. 3, 8A, and 8B, a tripping bar 14 is provided below tripping button 6. A portion of tripping bar 14 is covered with spring 14A, and a convex block 14B is provided at the bottom of tripping bar 14. Convex block 14B is located above the inner wall of the resetting/tripping device and the outer wall of lock 26.

As shown in FIGS. 8A and 8B, pressing tripping button 6 moves tripping bar 14 downwards. Convex block 14B inserts between the inner wall of tripper 25 and the outer wall of lock 26. Convex block 14B pushes lock 26 to move to the unlocking direction, allowing groove 4B of resetting guide column 4A to disengage from lock hole 26A of lock 26, making tripper 25 move downwards. Moving contacts 19A and 18A are disconnected from breakback contacts 21A and 20A, and the dimming switch has no power output.

As shown in FIGS. 3 and 5A, dimming bar 13 and dimmer 17 are provided below dimming button 5. One end of dimming bar 13 is connected with dimming button 5 and the other end is connected with dimmer 17. Dimmer 17 is installed on dimming control circuit 23, and is connected with the dimming circuit through wire. In the embodiment shown, dimmer 17 is an adjustable resistor. By rotating and increasing and decreasing pressure on dimming button 5, the output resistance of dimmer 17 is changed in order to change the output power of dimming control circuit 23 and the output power of the lamp, achieving the dimming purpose.

As shown in FIG. 3, to clearly indicate the amount of output power of the lamp controlled, a row of indication lamps 16B are provided on dimming control circuit 23. The light emitted is outputted through light leading tube 12 out of lighting hole 7 of flat plate button frame 2.

Figure 9:
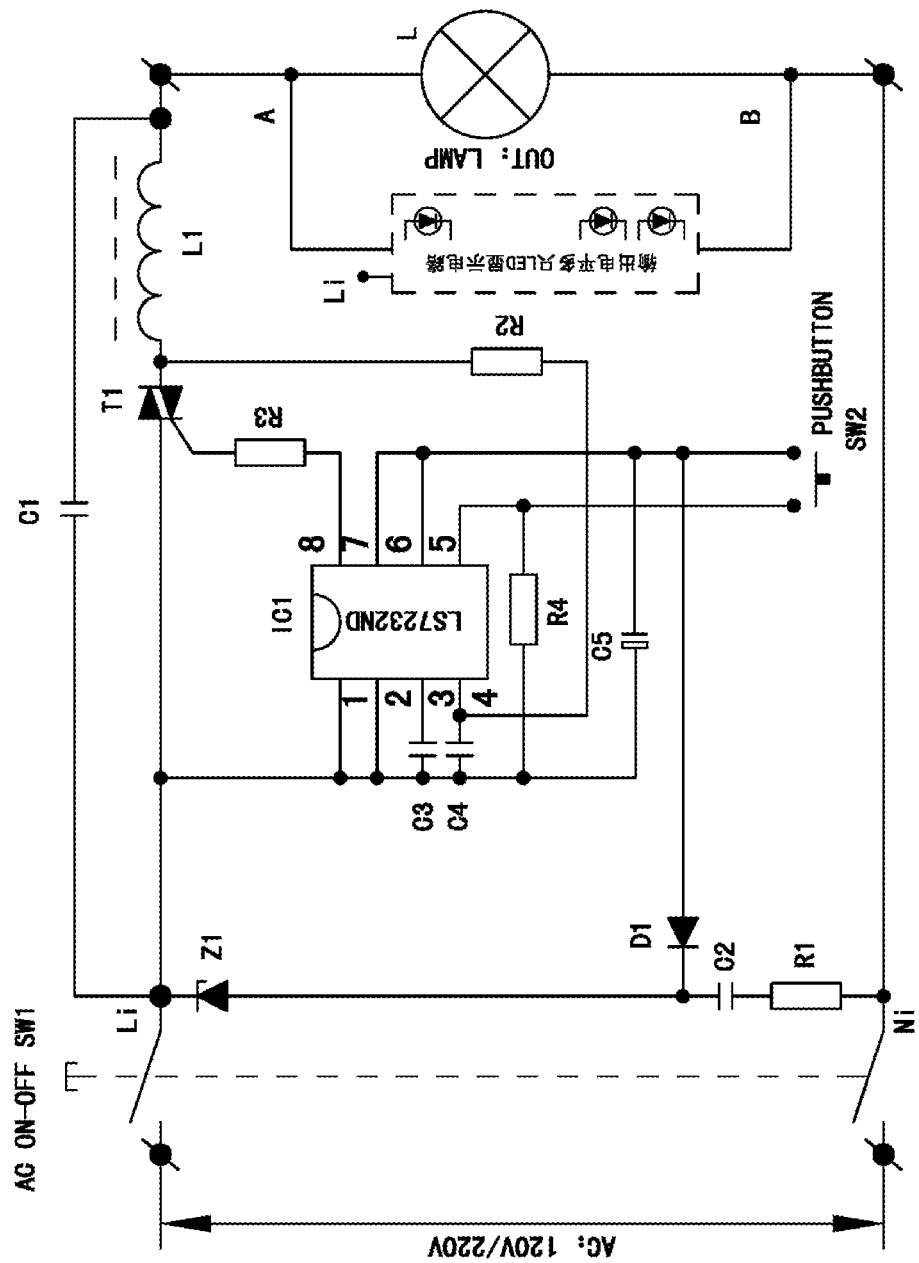
FIG. 9 is an example of a circuit diagram of a dimming control circuit.

FIG. 9 is an example of a circuit diagram of the dimming control circuit. As shown, the dimming control circuit includes touch dimming chip IC1, bi-directional thyristor T1, inducer L1, and power-regulating control button SW2 (dimming button 5 in FIG. 3).

The control signal output end 8 of touch dimming chip IC1 is connected through resistor R3 with the igniter of bi-directional thyristor T1. The touch control signal input ends 5 and 6 of touch dimming chip IC1 are connected with power-regulating control button SW2 (dimming button 5 in FIG. 3).

After bi-directional thyristor T1 is connected in series with inducer L1, one end is connected with a live wire of an AC power supply and the other end is connected with one end of the controlled lamp L. The other end of the controlled lamp L is connected with a zero wire of an AC power supply.

An LS7232ND touch dimming special chip IC1 produced by LSI Corporation of USA may be used to control the igniter angle of bi-directional thyristor T1. The realizable thyristor igniter angle is from 41° to 158°. The output power of the lamp is regulated using this arrangement by pressing power-regulating control button SW2. When SW2 is pressed for >0.4 s, the output power of the controlled lamp L can be regulated continuously from maximum to minimum and from minimum to maximum. When appropriate output power is achieved, releasing SW2 locks the output power at the achieved level. Pressing SW2 again for <0.4 s interrupts the power output and the original output power level will be stored. Pressing SW2 again for <0.4 s continues the power output as per the output power level before the interruption, realizing the purpose of controlling the output power of a lamp conveniently.

Therefore, the operation principle is as follows: By pressing power-regulating control button SW2 continuously, the igniter angle of bi-directional thyristor T1 is changed by virtue of touch dimming chip IC1, consequently changing the voltage applied across the lamp as well as the output power of the lamp and achieving the dimming purpose.

To ensure the normal working of the dimming switch, an absorption capacitor C1 for preventing electrical pulse radiation is connected in parallel across serially connected inducer L1 and thyristor T1. When bi-directional thyristor T1 is not broken over, the pulse of the reverse AC power generated due to cut-off of the thyristor is applied to and absorbed by capacitor C1, which is equivalent to instantaneous charging.

A voltage-regulator diode Z1 is connected in parallel at the power output end of the power-regulating switch circuit.

The dimming switch is connected to the live and zero wires of an AC power supply respectively through two independent groups of switches of main power supply switch SW1. After main power supply switch SW1 is turned off, the power-regulating switch circuit and load of this utility model are separated safely, facilitating the replacement of the lamp or contact load.

Figure 10:
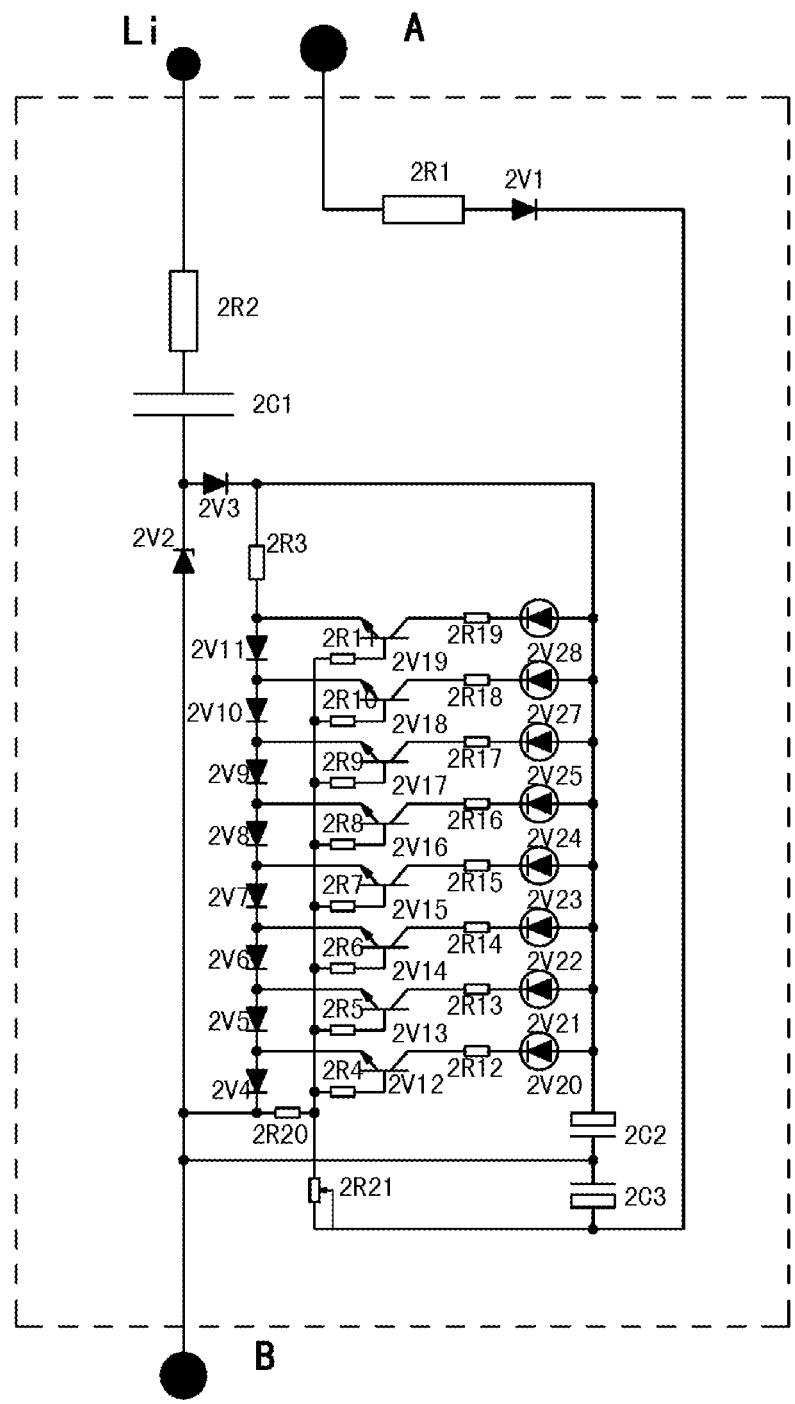
FIG. 10 is an example of a circuit diagram of an output indication circuit.

FIG. 10 is an example of a circuit diagram of the dimming output indication circuit of this utility model. This dimming output indication circuit is connected in parallel across the load/lamp controlled. It is divided into 8 levels. Along with the increment of output power of the load, the dimming output indicator (indicator 16B in FIG. 3) will increase the indication lighting levels until all the 8 levels are illuminated, indicating that the output power of the load/lamp controlled is at the maximum. When the output power of the load/lamp controlled is at the minimum, the voltage across the dimming output indication circuit is the lowest, and the output lighting level is the lowest.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A dimming switch, comprising:
   an enclosure comprising a mounting surface;
   a flat plate button mounted on the mounting surface;
   a dimming button;
   a tripping button;
   a dimmer mounted inside the enclosure;
   movable first and second elastic metal sheets;
   a resetting/tripping device comprising:
      a resetting guide column below the flat plate button, the guide column comprising a lock groove near a distal end;
      a resetting spring covering a portion of the resetting guide column;
      a T-shaped tripper abutting the first and second elastic metal sheets, the tripper comprising:
         lifting arms extending outwards from left and right sides;
         a central hole; and
         an outer surface;
      a lock comprising a lock hole, an inner wall, and an outer wall; and
      a lock spring between the outer surface of the tripper and the inner wall of the lock;
   a dimming control circuit;
   a power input end configured to connect to a live wire of a power supply; and
   a power output end configured to connect to an electrical load,
   wherein the resetting guide column passes through the central hole of the tripper and is configured with the resetting spring to selectively pass the lock groove in and out of contact with the lock,
   wherein the flat plate button is configured so that pressing the flat plate button moves the first and second elastic metal sheets to reset the resetting/tripping device, thereby electrically connecting the power input end with the power output end through the dimming control circuit,
   wherein the dimming button is configured so that rotating the dimming button and pressing the dimming button up and down regulates the output voltage of the dimming control circuit through the dimmer, and
   wherein, when the tripping button is pressed, the tripping button is configured to push the outer wall of the lock and trip the resetting/tripping device so that the first and second elastic metal sheets move and the electrical connection between the power input end and the power output end is cut off through the dimming control circuit.

2. The switch of claim 1, further comprising:
respective first and second ends on each of the first and second elastic metal sheets;
first and second moving contacts on each first end of the first and second elastic metal sheets;
a power input metal sheet having a first input sheet end and a second input sheet end, the second input sheet end comprising a first breakback contact; and
a power output metal sheet having a first output sheet end and a second output sheet end, the second output sheet end comprising a second breakback contact,
wherein the resetting/tripping device is located below the flat plate button,
wherein the T-shaped tripper is located below the flat plate button and is interlocked with the flat plate button,
wherein the first ends of first and second elastic metal sheets are located above the lifting arms and are configured to move up and down along with the tripper,
wherein a portion of the first end of first elastic metal sheet is welded to the dimming control circuit and the second end of the first elastic metal sheet is suspended below the power input metal sheet,
wherein a portion of the first end of second elastic metal sheet is welded to the dimming control circuit and the second end of the second elastic metal sheet is suspended below the power output metal sheet,
wherein the first input sheet end of the power input metal sheet is welded to the dimming control circuit and is connected to the power input end and the second input sheet end of the power input metal sheet is suspended above the first elastic metal sheet,
wherein the first output sheet end of the power output metal sheet is welded to the dimming control circuit and is connected to the power output end and the second output sheet end of the power output metal sheet is suspended above the second elastic metal sheet,
wherein, when the resetting/tripping device is in a tripped state, the power input metal sheet and the power output metal sheet do not contact the first and second elastic metal sheets and the dimming switch is not configured to output power, and
wherein, when the resetting/tripping device is in a reset state, the first and second breakback contacts contact first and second moving contacts and the dimming switch is configured to output power.

3. The switch of claim 2, wherein:
the resetting guide column is configured to move up and down along the central hole, and the resetting guide column comprises
a tip-shaped bottom surface,
a portion of the resetting guide column protrudes downwardly through the central hole,
the lock is movable and comprises a metal material,
the switch is configured so that when the flat plate button is not pressed, the tip-shaped bottom surface is located above the lock and is semi-offset with the lock hole,
the switch is configured so that when the flat plate button is not pressed, the portion of the resetting guide column that protrudes downwardly through the central hole is semi-offset with the lock hole,
the switch is configured so that when the flat plate button is pressed, the tip-shaped bottom surface of the resetting guide column penetrates the lock hole, the lock is pushed, and the lock spring is compressed, and
the switch is configured so that when the flat plate button is released from a pressed state, the resetting guide column moves up, the lock groove is clutched in the lock hole, the tripper moves up via a driving force from the lock, and the resetting/tripping device is reset.

4. The switch of claim 3, wherein:
the switch further comprises:
a tripping bar below the tripping button, the tripping bar having a bottom surface;
a tripping spring covering a portion of the tripping bar; and
a convex block located at the bottom surface of the tripping bar,
the resetting/tripping device further comprises an inner wall,
the convex block is selectively located above the inner wall of the resetting/tripping device and the outer wall of the lock, and
the tripping button is configured so that when the tripping button is pressed, the tripping bar moves downward, the convex block inserts between the inner wall of the resetting/tripping device and the outer wall of the lock, the lock moves in an unlocking direction, the lock groove disengages from the lock hole, and the resetting/tripping device trips.

5. The switch of claim 4, wherein:
the switch further comprises:
a dimming bar below the dimming button, the dimming bar having a first end and a second end; and
a dimmer below the dimming button,
the first end of the dimming bar is connected to the dimming button and the second end of the dimming bar is connected to the dimmer, and
the dimmer is installed in the dimming control circuit.

6. The switch of claim 5, wherein:
the dimmer comprises an adjustable resistor, and
the dimming button in configured to rotate and press up and down to change the output resistance of the dimmer.

7. The switch of claim 6, further comprising:
a row of indication lamps on the dimming control circuit;
a light leading tube; and
a frame for receiving the flat plate button, the frame comprising a lighting hole,
wherein the indication lamps are configured to emit light, and emitted light passes through the light leading tube and out the lighting hole.

8. The switch of claim 7, wherein:
the enclosure comprises:
a panel comprising a panel hole in the middle; and
a base,
the frame is installed in the panel hole, and the frame further comprises a first pin-joint interface,
the flat plate button further comprises a second pin-joint interface, the second pin-joint interface comprising a shaft,
the first pin-joint interface and the second pin-joint interface co-act to enable the flat plate button to rotate up and down when the flat plate button is pressed, and
the dimming button, the tripping button, and the lighting hole are mounted on the frame.

9. The switch of claim 8, wherein the flat plate button further comprises a dimming button hole at an end of the flat plate button, and the dimming button is located in the dimming button hole such that the dimming button is elevated higher than the flat plate button.

10. The switch of claim 5, further comprising:
a row of indication lamps on the dimming control circuit;
a light leading tube; and
a frame for receiving the flat plate button, the frame comprising a lighting hole,
wherein the indication lamps are configured to emit light, and emitted light passes through the light leading tube and out the lighting hole.

11. The switch of claim 10, wherein:
the enclosure comprises:
  a panel comprising a panel hole in the middle; and
  a base,
the frame is installed in the panel hole, and the frame further comprises a first pin-joint interface,
the flat plate button further comprises a second pin-joint interface, the second pin-joint interface comprising a shaft,
the first pin-joint interface and the second pin-joint interface co-act to enable the flat plate button to rotate up and down when the flat plate button is pressed, and
the dimming button, the tripping button, and the lighting hole are mounted on the frame.

12. The switch of claim 11, wherein the flat plate button further comprises a dimming button hole at an end of the flat plate button, and the dimming button is located in the dimming button hole such that the dimming button is elevated higher than the flat plate button.

13. The switch of claim 3, wherein, when the flat plate button receives pressure and then when the pressure on the flat plate button is released, the resetting guide column moves upward via the spring force of the resetting spring.

14. The switch of claim 13, wherein, when the flat plate button is pressed, the resetting guide column moves along with the movement of the flat plate button and the flat plate button moves along with the resetting guide column and the resetting spring.

15. The switch of claim 1, wherein:
the resetting guide column is configured to move up and down along the central hole, and the resetting guide column comprises a tip-shaped bottom surface,
a portion of the resetting guide column protrudes downwardly through the central hole,
the lock is movable and comprises a metal material,
the switch is configured so that when the flat plate button is not pressed, the tip-shaped bottom surface is located above the lock and is semi-offset with the lock hole,
the switch is configured so that when the flat plate button is not pressed, the portion of the resetting guide column that protrudes downwardly through the central hole is semi-offset with the lock hole,
the switch is configured so that when the flat plate button is pressed, the tip-shaped bottom surface of the resetting guide column penetrates the lock hole, the lock is pushed, and the lock spring is compressed, and
the switch is configured so that when the flat plate button is released from a pressed state, the resetting guide column moves up, the lock groove is clutched in the lock hole, the tripper moves up via a driving force from the lock, and the resetting/tripping device is reset.

16. The switch of claim 1, wherein:
the switch further comprises:
  a tripping bar below the tripping button, the tripping bar having a bottom surface;
  a tripping spring covering a portion of the tripping bar; and
  a convex block located at the bottom surface of the tripping bar, the resetting/tripping device further comprises an inner wall,
the convex block is selectively located above the inner wall of the resetting/tripping device and the outer wall of the lock, and
the tripping button is configured so that when the tripping button is pressed, the tripping bar moves downward, the convex block inserts between the inner wall of the resetting/tripping device and the outer wall of the lock, the lock moves in an unlocking direction, the lock groove disengages from the lock hole, and the resetting/tripping device trips.

17. The switch of claim 1, wherein, when the flat plate button receives pressure and then when the pressure on the flat plate button is released, the resetting guide column moves upward via the spring force of the resetting spring.

18. The switch of claim 1, wherein, when the flat plate button is pressed, the resetting guide column moves along with the movement of the flat plate button and the flat plate button moves along with the resetting guide column and the resetting spring.

19. A dimming switch, comprising:
an enclosure comprising a mounting surface;
a flat plate button mounted on the mounting surface;
a dimming button;
a dimmer mounted inside the enclosure;
movable first and second elastic metal sheets;
a resetting/tripping device comprising:
  a resetting guide column below the flat plate button, the guide column comprising a lock groove near a distal end;
  a resetting spring covering a portion of the resetting guide column;
  a T-shaped tripper abutting the first and second elastic metal sheets, the tripper comprising:
    lifting arms extending outwards from left and right sides;
    a central hole; and
    an outer surface;
  a lock comprising a lock hole, an inner wall, and an outer wall; and
  a lock spring between the outer surface of the tripper and the inner wall of the lock;
a power input end configured to connect to a live wire of a power supply; and
a power output end configured to connect to an electrical load,
wherein the resetting guide column passes through the central hole of the tripper and is configured with the resetting spring to selectively pass the lock groove in and out of contact with the lock,
wherein the flat plate button is configured so that pressing the flat plate button moves the first and second elastic metal sheets to electrically connect the power input end with the power output end,
wherein the dimming button is configured so that rotating the dimming button and pressing the dimming button up and down regulates the dimmer.

20. The switch of claim 19, further comprising a tripping button, wherein, when the tripping button is pressed, the tripping button is configured to push the outer wall of the lock and trip the resetting/tripping device so that the first and second elastic metal sheets move and the electrical connection between the power input end and the power output end is cut off.

* * * * *